United States Patent
Ju et al.

(10) Patent No.: US 7,754,362 B2
(45) Date of Patent: Jul. 13, 2010

(54) FUEL CELL SYSTEM

(75) Inventors: Ri-A Ju, Suwon-si (KR); Jin-Hong An, Suwon-si (KR); Ho-Jin Kweon, Suwon-si (KR); Jong-Ki Lee, Suwon-si (KR); Sang-Hyeon Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1150 days.

(21) Appl. No.: 11/372,256

(22) Filed: Mar. 8, 2006

(65) Prior Publication Data

US 2006/0204804 A1    Sep. 14, 2006

(30) Foreign Application Priority Data

Mar. 9, 2005    (KR) .................. 10-2005-0019536

(51) Int. Cl.
*H01M 8/04* (2006.01)
(52) U.S. Cl. .......................................... 429/23; 429/22
(58) Field of Classification Search .............. 429/12–46
See application file for complete search history.

(56) References Cited

U.S. PATENT DOCUMENTS

2003/0022031 A1*    1/2003    Manery ..................... 429/7

FOREIGN PATENT DOCUMENTS

JP    2003229138 A    *    8/2003

OTHER PUBLICATIONS

Machine Translation of JP 2003-229138 (Aug. 2003).*

* cited by examiner

*Primary Examiner*—Dah-Wei D Yuan
*Assistant Examiner*—Zachary Best
(74) *Attorney, Agent, or Firm*—Christie, Parker & Hale, LLP

(57) ABSTRACT

A fuel cell system includes a stack for generating electrical energy through electro-chemical reaction between a fuel and oxygen and supplying the electrical energy to a load, a fuel supply unit for supplying the fuel to the stack, an oxygen supply unit for supplying the oxygen to the stack, and a comparator coupled to the stack to compare an electricity output value of the stack with a reference electricity output value corresponding to the load and to selectively electrically connect the stack to the load according to the electricity output value.

18 Claims, 3 Drawing Sheets

FUEL CELL SYSTEM

CROSS-REFERENCE TO RELATED APPLICATION

This application claims priority to and the benefit of Korean Patent Application No. 10-2005-0019536 filed in the Korean Intellectual Property Office on Mar. 9, 2005, the entire content of which is incorporated herein by reference.

BACKGROUND OF THE INVENTION

1. Field of the Invention

The present invention relates to a fuel cell system, and more particularly, to a fuel cell system capable of sensing an electricity output value of a stack in the fuel cell system.

2. Description of the Related Art

A fuel cell system is an electricity generating system which directly converts chemical reaction energy of oxygen and hydrogen contained in a hydrocarbon material such as methanol, ethanol, and natural gas into electrical energy.

The recently developed polymer electrolyte membrane fuel cell (PEMFC) has an excellent output characteristic, a low operating temperature, and fast starting and response characteristics. In addition, the polymer electrolyte fuel cell advantageously has a wide range of applications including a mobile power source for vehicles, a distributed power source for home or buildings, and a small-sized power source for electronic apparatuses.

A fuel cell system employing the PEMFC includes a stack, a reformer, a fuel tank, and a fuel pump. The stack constitutes an electricity generation assembly constructed with a plurality of unit cells, and the fuel pump supplies the fuel of the fuel tank to the reformer. The reformer reforms the fuel to generate a reformed gas containing hydrogen and supplies the reformed gas to the stack.

In the fuel cell system, the fuel pump operates to supply the fuel of the fuel tank to the reformer, and the reformer reforms the fuel to generate the reformed gas. The reformed gas is supplied to the stack, and air is supplied to the stack through a separate air pump. Finally, the stack performs electro-chemical reaction of the reformed gas and oxygen contained in the air to generate electrical energy.

In a fuel cell system employing a direct methanol fuel cell (DMFC), a fuel is directly supplied to a stack without being reformed by a reformer.

In conventional fuel cell systems, electricity output value of the stack is sensed, and the whole system including pumps, auxiliary power supply unit, and the like is controlled according to the electricity output value. Therefore, conventional fuel cell systems typically include a voltage sensor for sensing the electricity output value.

Due to the voltage sensor provided to the conventional fuel cell system, the circuitry and mechanical designs become complicated. Accordingly, there is a problem in that the size and power consumption of the system increases.

Particularly, when small-sized mobile apparatus employs such a fuel cell system, the increase in size of the system causes a limitation in the product design of such fuel cell system.

SUMMARY OF THE INVENTION

The present invention provides a fuel cell system having a simple structure capable of sensing an electricity output value generated from a stack. The term "electricity output value" as used herein may denote a voltage or current value of an electricity or electrical output.

According to an aspect of the present invention, there is provided a fuel cell system having an electricity generator for generating electric energy through electro-chemical reaction between hydrogen and oxygen. The fuel cell system includes a comparator coupled to an output port of the electricity generator to compare an electricity output value of the electric energy generated by the electricity generator with a reference electricity output value corresponding to a load.

In the above aspect of the present invention, the comparator may detect a voltage or current value of the electricity generator.

According to another aspect of the present invention, there is provided a fuel cell system including a stack for generating electrical energy through electro-chemical reaction between a fuel and oxygen and supplying the electrical energy to a load; a fuel supply unit for supplying the fuel to the stack, an oxygen supply unit for supplying the oxygen to the stack, and a comparator coupled to the stack to compare an electricity output value of the stack with a reference electricity output value corresponding to the load and to selectively electrically connect the stack to the load according to the electricity output value.

In the above aspect of the present invention, the fuel cell system may further include an auxiliary power supply unit for supplying an auxiliary power to the load according to the electricity output value detected by the comparator.

In addition, when the electricity output value of the stack exceeds the reference electricity output value, the stack may be electrically connected to the load.

In addition, when the electricity output value of the stack does not exceed the reference electricity output value, the auxiliary power supply unit may be electrically connected to the load.

In addition, the auxiliary power supply unit may include a secondary battery adapted to be electrically connected to the load.

In addition, the stack may include a plurality of electricity generators stacked together, wherein each of the electricity generators includes a membrane electrode assembly (MEA) and separators disposed in close contact with respective surfaces of the membrane electrode assembly.

According to another aspect of the present invention, a fuel cell system for supplying power to a load is provided. The fuel cell system includes a stack of electricity generators, an auxiliary power supply unit, a voltage reference unit, and a compare unit. The stack generates electric energy through electro-chemical reaction between hydrogen and oxygen. The auxiliary power supply unit provides an output, and the voltage reference unit provides a reference voltage. The compare unit compares a voltage of the generated electric energy with the reference voltage to supply the generated electric energy or the output of the auxiliary power supply unit to the load according to a comparison result.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

Figure 1:
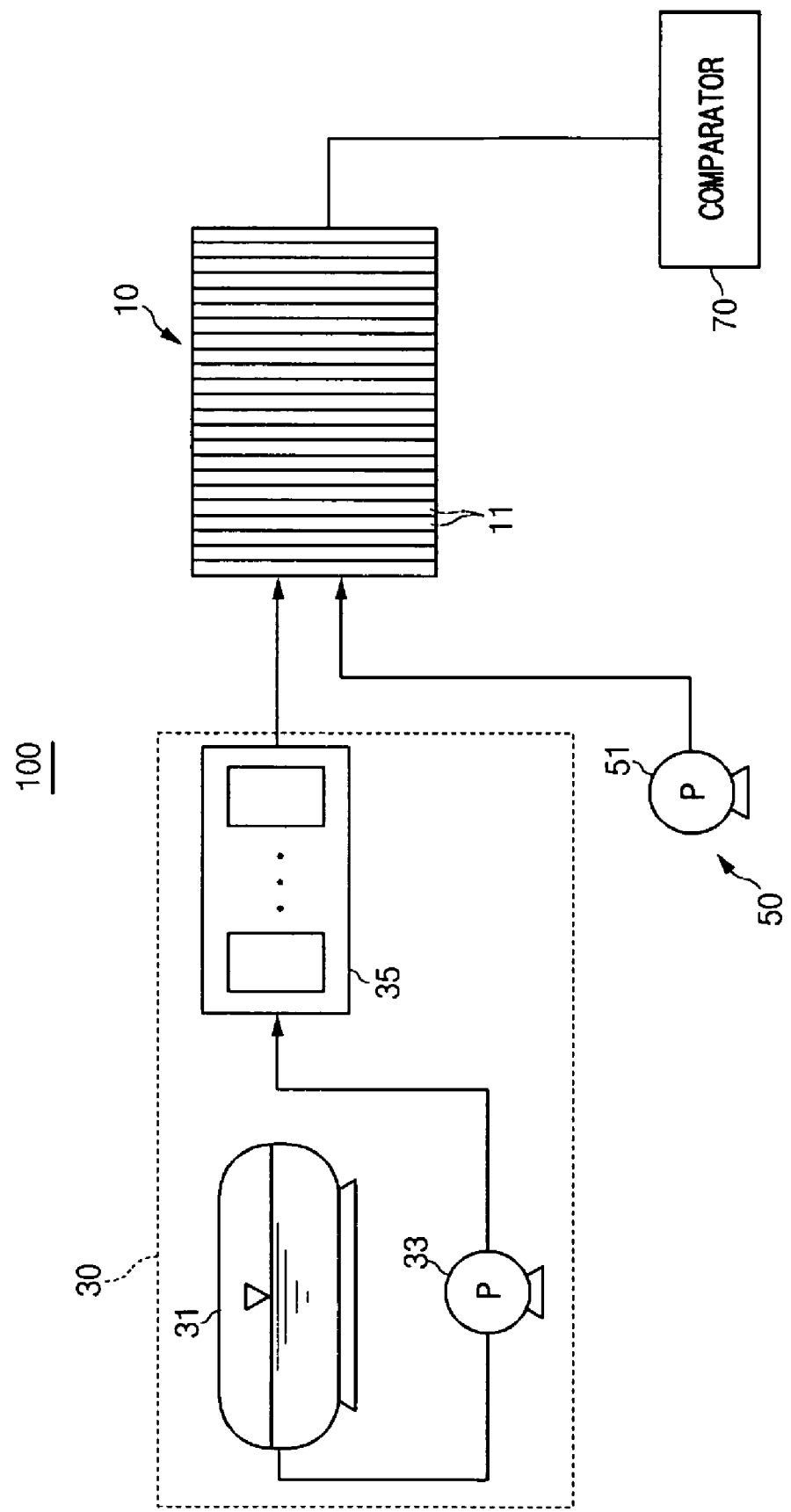
FIG. 1 is a schematic diagram showing a construction of a fuel cell system according to an embodiment of the present system.

FIG. 1 is a schematic diagram showing a construction of a fuel cell system according to an embodiment of the present system.

Referring to FIG. 1, the fuel cell system 100 employs a polymer electrode membrane fuel cell (PEMFC) which reforms a fuel containing hydrogen and performs electrochemical reaction of the hydrogen and an oxidant gas to generate electrical energy.

In the fuel cell system 100, the fuel used to generate electricity may be any suitable liquid or gaseous fuel such as methanol, ethanol, and natural gas or hydrogen generated by reforming the fuel. In the described embodiment, the liquid fuel is exemplified.

As the oxidant gas, an oxygen gas stored in a separate storage unit or air containing oxygen can be used. In the described embodiment, the air is exemplified.

The fuel cell system 100 includes a stack 10 which generates electrical energy through the electro-chemical reaction of the hydrogen and the oxygen, a fuel supply unit 30 which generates a reformed gas containing hydrogen from the fuel and supplies the reformed gas to the stack 10, and an oxygen supply unit 50 which supplies the oxygen to the stack 10.

Figure 2:
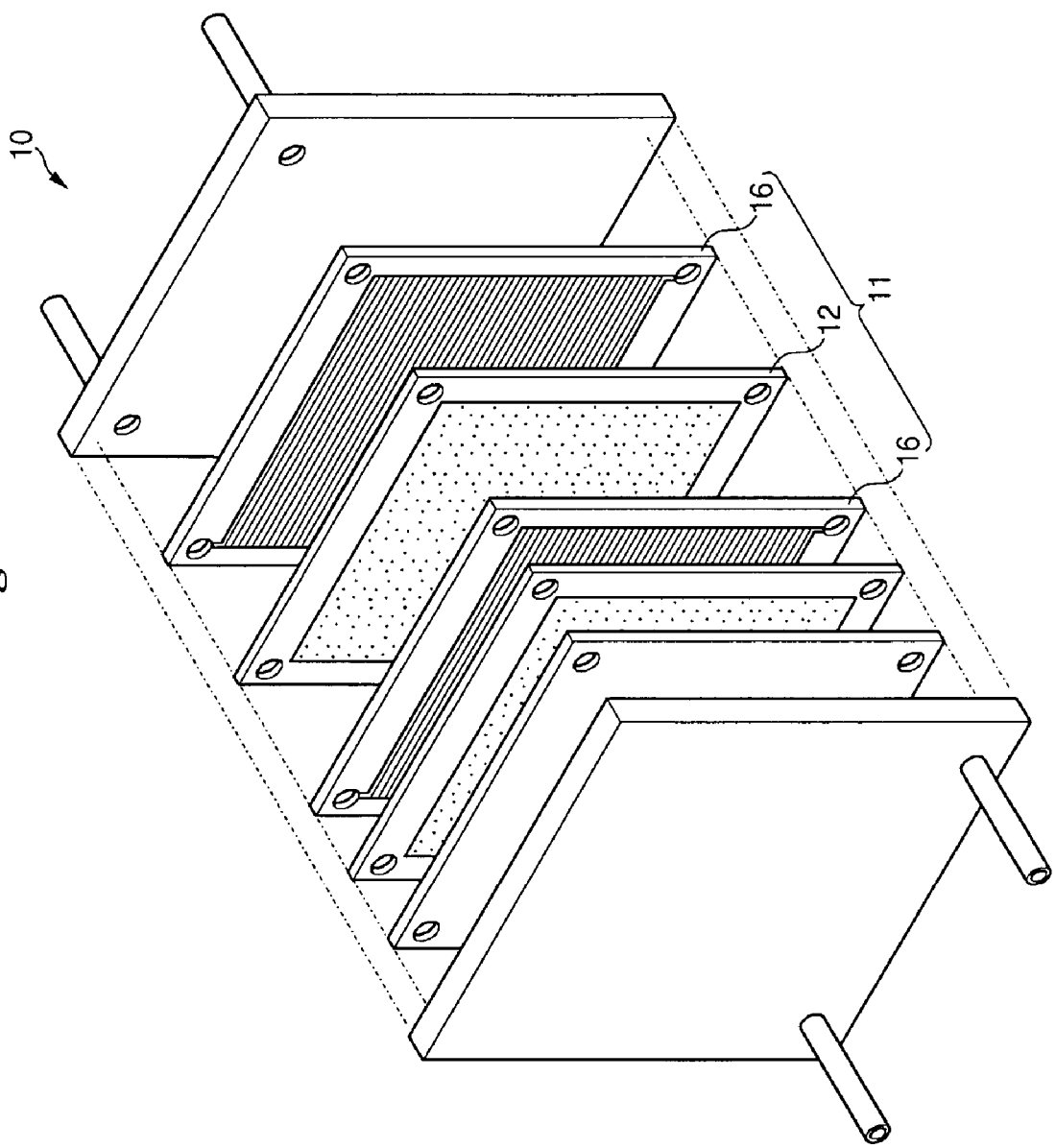
FIG. 2 is a perspective exploded view of a stack shown in FIG. 1.

As shown in FIG. 2, the stack 10 includes an electricity generator 11 having a membrane electrode assembly (MEA) 12 and two separators (or bipolar plates) 16 disposed in close contact with respective surfaces of the membrane electrode assembly 12. The electricity generator 11 constitutes a unit fuel cell (or a unit cell) for generating the electrical energy through the electro-chemical reaction of the oxygen and the hydrogen contained in the reformed gas.

The stack 10 may have a structure constructed by stacking a plurality of the electricity generators 11.

A comparator 70 is provided at an output port of the stack 10. The comparator 70 will be described later in detail.

The fuel supply unit 30 includes a fuel tank 31 which stores the above-described liquid fuel, a fuel pump 33 which is connected to the fuel tank 31 to discharge the fuel from the fuel tank 31, and a reformer 35 which is disposed between the fuel tank 31 and the stack 10 to generate a reformed gas containing hydrogen from the fuel supplied by the fuel tank 33 and supply the reformed gas to the electricity generator 11.

The reformer 35 may generate the reformed gas through a reforming catalytic reaction such as a steam reforming reaction, a partial oxidation reaction, and/or an auto-thermal reaction.

Moreover, the reformer 35 can reduce a concentration of carbon monoxide contained in the reformed gas through a catalytic reaction such as a water-gas shift reaction and a preferential oxidation reaction and/or a hydrogen purification reaction.

The oxygen supply unit 50 includes an air pump 51 for sucking the air and supplying the air to the electricity generator 11.

Alternatively, the fuel cell system according to the present invention may employ a direct oxidation membrane fuel cell such as a direct methanol fuel cell (DMFC) where a liquid fuel such as methanol or ethanol is directly supplied to the electricity generator without being reformed by a reformer and electrical energy is generated by performing electro-chemical reaction of the hydrogen and the oxygen. In the direct oxidation fuel cell system, the reformer is not used, and a fuel supply unit may be constructed with a fuel tank and a fuel pump.

In the fuel cell system 100 according to the described embodiment, the reformed gas is supplied to the electricity generator 11 through the fuel supply unit 30, and the air is supplied to the electricity generator 11 through the oxygen supply unit 50. The electricity generator 11 generates electrical energy through the electro-chemical reaction of the hydrogen contained in the reformed gas and the oxygen contained in the air.

Figure 3:
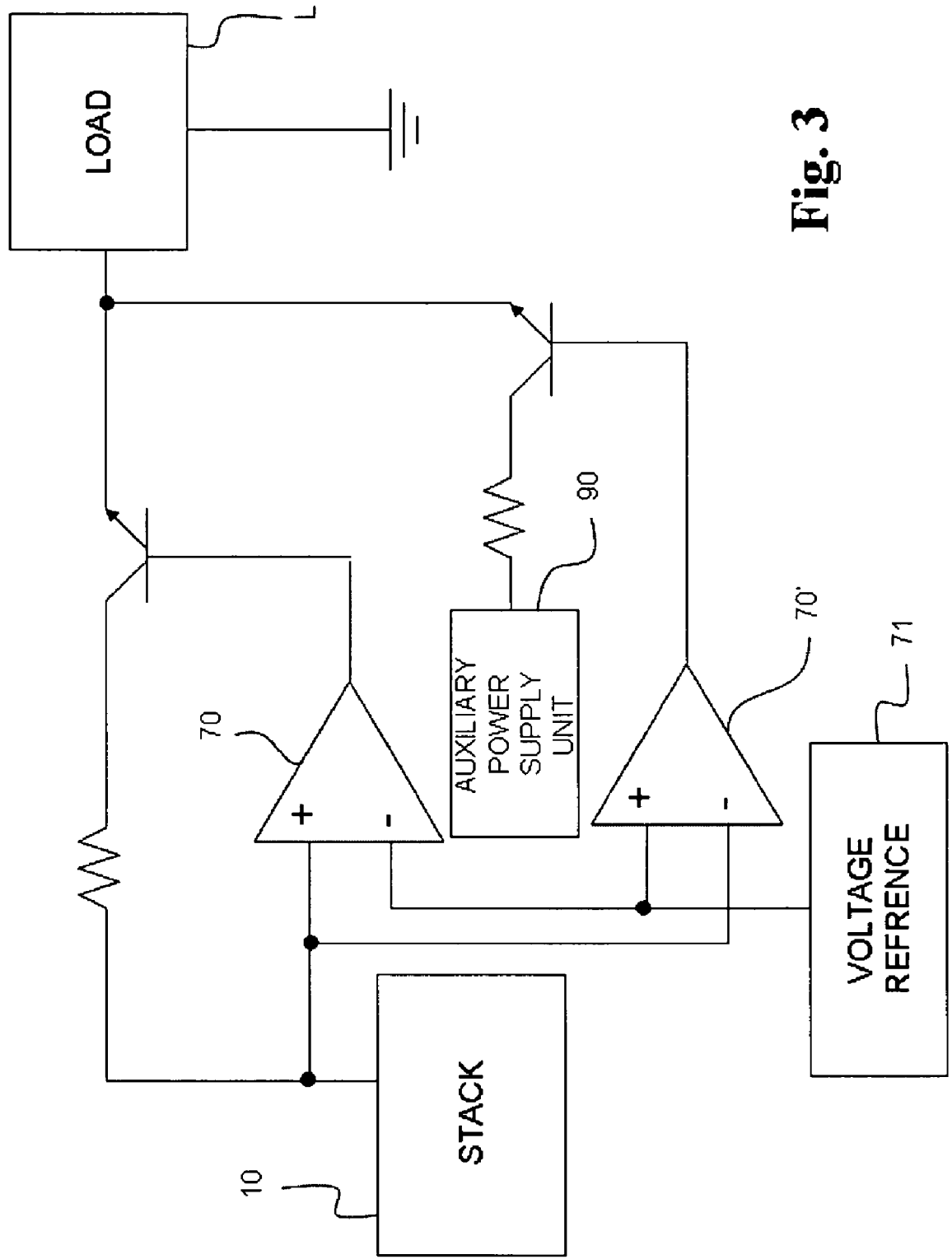
FIG. 3 is a block diagram that illustrates operations of a fuel cell system according to an embodiment of the present invention.

FIG. 3 is a block diagram illustrating operations of a fuel cell system according to an embodiment of the present invention. The comparator 70 has a function of comparing an electricity output value of the stack 10 with a reference electricity output value required by an arbitrary load L and selectively connecting the stack 10 to the load L according to the electricity output values.

A voltage or current value of the electricity energy output from the stack 10 may be referred to as an electricity output value. In the described embodiment, the electricity output value is an output voltage of the stack 10. A reference voltage of the reference voltage supply unit 71 may be referred to as a reference electricity output value, and will be described later in detail.

In the described embodiment, the comparator 70 includes positive and negative input ports, and the comparator 70 is electrically connected to the output port of the stack 10 and a reference voltage of the load L. More specifically, the positive input port of the comparator 70 is connected to the output port of the stack 10, and the negative input port of the comparator 70 is connected to the reference voltage supply unit 71 which may be implemented with a conventional reference voltage generation circuit.

In addition to the aforementioned components, the comparator 70 may include resistors, transistors, and/or the like. Since these components are typically included in a comparator as those skilled in the art would know, detailed description thereof is omitted.

During the operation of the fuel cell system 100, an arbitrary voltage is output from the stack 10. In the embodiment, the comparator 70 compares the output voltage of the stack 10 with the reference voltage of the reference voltage supply unit 71, and when the output voltage exceeds the reference voltage, the connection between the stack 10 and the load L is sustained. As a result, the output voltage of the stack 10 is applied to the load L through a switch (e.g., a power transistor) coupled to the comparator 70.

On the other hand, when the output voltage does not exceed the reference voltage, the disconnection between the stack 10 and the load L is sustained. As a result, the output voltage of the stack 10 is not applied to the load L.

In addition, the fuel cell system 100 according to an embodiment of the present invention may further include an auxiliary power supply unit 90 for selectively supplying an auxiliary power to the load L according to the output voltage detected by the comparator 70.

The auxiliary power supply unit 90 may include a secondary battery, which is electrically connected to the load L via a switch (e.g., power transistor) coupled to a comparator 70', which may be substantially the same as the comparator 70. The comparator 70', for example, receives the output of the stack at its negative input port and receives the reference voltage at its positive input port. The secondary battery may be a conventional secondary battery The secondary battery, that is, a rechargeable battery, may be provided so as to be selectively connected to the load L through the switch coupled to the comparator 70'. The comparators 70', 70 and the switches may together be referred to as a compare unit.

In the aforementioned case, while the disconnection between the stack 10 and the load L is sustained, the auxiliary power supply unit 90 supplies the auxiliary power to the load L.

In a fuel cell system according to the described embodiment of the present invention, an electricity output value of a stack can be detected by using a comparator, so that a whole construction of the fuel cell system and a control process can be simply implemented. Accordingly, it is possible to reduce a size and power consumption of the fuel cell system.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. The scope of the present invention is to be defined by the appended claims and their equivalents.

What is claimed is:

1. A fuel cell system having an electricity generator for generating electric energy through electro-chemical reaction between hydrogen and oxygen, the fuel cell system comprising: a first comparator having a positive input port and a negative input port, wherein the positive input port is connected to an output port of the electricity generator for providing the generated electric energy; a reference supply circuitry for providing a reference electricity output value corresponding to a load; a first transistor switch having a control input connected to an output of the first comparator, the first transistor switch for providing the generated electric energy to the load based on the output of the first comparator; a second comparator having a positive input port and a negative input port, wherein the positive input port of the second comparator is connected to the reference supply circuitry and the negative input port of the second comparator is connected to the output port of the electricity generator; an auxiliary power supply unit for providing an output connectable to the load; and a second transistor switch having a control input connected to an output of the second comparator, the second transistor switch for providing the output of the auxiliary power supply unit to the load based on the output of the second comparator, wherein the negative input port of the first comparator is connected to the reference supply circuitry, and wherein the first comparator is configured to compare an electricity output value of the electric energy generated by the electricity generator with the reference electricity output value corresponding to the load.

2. The fuel cell system of claim 1, wherein the first comparator detects a voltage or current value of the electricity generator.

3. The fuel cell system of claim 1, wherein the electricity generated by the electricity generator is provided to the load according to a result of comparison by the first comparator.

4. A fuel cell system comprising:
a stack for generating electric energy through electrochemical reaction between a fuel and oxygen and for supplying the electric energy to a load;
a fuel supply unit for supplying the fuel to the stack;
an oxygen supply unit for supplying the oxygen to the stack;
a first comparator having a positive input port and a negative input port, the positive input port connected to an output of the stack for providing the generated electric energy;
a reference supply circuitry for providing a reference electricity output value corresponding to a load;
a first transistor switch having a control input connected to an output of the first comparator, the first transistor switch for providing the generated electric energy to the load based on the output of the first comparator;
a second comparator having a positive input port and a negative input port, wherein the positive input port of the second comparator is connected to the reference supply circuitry and the negative input port of the second comparator is connected to the output of the stack;
an auxiliary power supply unit for providing an output connectable to the load; and
a second transistor switch having a control input connected to an output of the second comparator, the second transistor switch for providing the output of the auxiliary power supply unit to the load based on the output of the second comparator,
wherein the negative input port of the first comparator is connected to the reference supply circuitry, and
wherein the first comparator is configured to compare an electricity output value of the stack with the reference electricity output value corresponding to the load and to selectively electrically connect the stack to the load according to the electricity output value.

5. The fuel cell system of claim 4, wherein the auxiliary power supply unit is configured to supply an auxiliary power to the load according to the electricity output value detected by the second comparator.

6. The fuel cell system of claim 4, wherein, when the electricity output value of the stack exceeds the reference electricity output value, the stack is electrically connected to the load.

7. The fuel cell system of claim 5, wherein, when the electricity output value of the stack does not exceed the reference electricity output value, the auxiliary power supply unit is electrically connected to the load.

8. The fuel cell system of claim 5, wherein the auxiliary power supply unit comprises a secondary battery adapted to be electrically connected to the load.

9. The fuel cell system of claim 4, wherein the stack comprises a plurality of electricity generators stacked together, and wherein each of the electricity generators comprises a membrane electrode assembly and separators disposed in close contact with respective surfaces of the membrane electrode assembly.

10. The fuel cell system of claim 4, wherein the fuel comprises a gaseous fuel.

11. The fuel cell system of claim 4, wherein the fuel comprises a liquid fuel.

12. The fuel cell system of claim 4, wherein the oxygen is obtained from air.

13. A fuel cell system for supplying power to a load, the fuel cell system comprising: a stack of electricity generators for generating electric energy through electro-chemical reaction between hydrogen and oxygen; an auxiliary power supply unit for providing an output; a voltage reference unit for providing a reference voltage; a first compare unit for comparing a voltage of the generated electric energy with the reference voltage to supply the generated electric energy or the output of the auxiliary power supply unit to the load according to a comparison result; a first transistor switch having a control input connected to an output of the first compare unit, the first transistor switch for providing the generated electric energy to the load based on the output of the first compare unit; a second compare unit having a positive input port and a negative input port, wherein the positive input port of the second compare unit is connected to the voltage reference unit and the negative input port of the second compare unit is connected to an output port of the stack; and a second transistor switch having a control input connected to an output of the second compare unit, the second transistor switch for providing the output of the auxiliary power supply unit to the load based on the output of the second compare unit, wherein the first compare unit comprises a positive input port and a negative input port, wherein the positive input port of the first compare unit is connected to the output port of the stack for receiving the generated electric energy, and wherein the negative input port of the first compare unit is connected to the voltage reference unit for receiving the reference voltage.

14. The fuel cell system of claim 13, wherein the generated electric energy is provided to the load when the voltage of the generated electric energy is higher than the reference voltage and the output of the auxiliary power supply unit is provided to the load when the reference voltage is higher than the voltage of the generated electric energy.

15. The fuel cell system of claim 13, wherein the first compare unit is configured to output a positive value output when the voltage of the generated electric energy is higher than the reference voltage, and the second compare unit is configured to output a positive value output when the reference voltage is higher than the voltage of the generated electric energy.

16. The fuel cell system of claim 15, wherein the first switch is configured to provide the generated electric energy to the load in response to the positive value output of the first compare unit, and the second switch is configured to provide the output of the auxiliary power supply unit to the load in response to the positive value output of the second compare unit.

17. The fuel cell system of claim 13, wherein the auxiliary power supply unit comprises a secondary battery adapted to be electrically connected to the load.

18. The fuel cell system of claim 13, further comprising a fuel supply unit for providing a fuel to the stack for the electro-chemical reaction.

* * * * *